3,705,813
MEAT PROCESSING
Paul W. Vogel, Pekin, and John H. Silliker, Park Forest,
Ill., assignors to Meat Technology, Inc., Chicago
Heights, Ill.
No Drawing. Filed May 12, 1970, Ser. No. 36,684
Int. Cl. A22c 18/00; A23b 1/06
U.S. Cl. 99—194                                        14 Claims

ABSTRACT OF THE DISCLOSURE

Methods of processing products to reduce the contamination thereof with microorganisms, especially psychrophilic bacteria, which normally limit shelf storage life of packaged and other meat products under refrigerated conditions.

Special decontamination procedures and apparatus are also provided to decontaminate meat products that have pre-existing population of bacteria on the surfaces thereof. Meat products include both red meats, fish and poultry.

BACKGROUND OF THE INVENTION

Field of the invention

This invention relates to the processing of meat products under conditions which reduce or limit contamination thereof with psychrophilic microorganisms and to methods for processing meat which include decontamination procedures to reduce the surface bacteria population and produce meat products which have enhanced storage life under normal refrigerated and frozen conditions.

Description of the prior art

The prior art techniques for handling foodstuffs, especially fresh meat carcasses have commonly involved various types of sanitation procedures. These include washing, singeing, spraying, steaming and the like. The objective fulfilled by washing, singeing and spraying with water is the removal of gross foreign material from the surfaces of the meat, not the extensive destruction of resident bacteria on the surface of the meat. Similarly, the steaming of such meat does not have as its objective the extensive destruction of resident bacteria, since under the conditions that steam is used the temperatures employed are not sufficiently high to effect such extensive destruction of surface microorganisms.

Steam has, however, been used for the destruction of bacteria on the surface of meats that have been fully cooked. This use of steam has been employed on the cooked product at a point somewhat prior to the finished packaging of the cooked meat.

The prior art procedures used on fresh meat are unsatisfactory, as indicated above. The procedure used on cooked meats is not applicable to fresh meats, since the time-temperature relationships employed on the cooked meats would result in extensive cooking and denaturation of the fresh meat and thus would produce an unsatisfactory fresh meat product. On the other hand, these problems do not exist in the treatment of certain cooked meats, since the protein of such products is already denatured.

Studies have shown that only a minor proportion, for example, less than 1% of the microorganisms contaminating meat carcasses as they leave the killing floor and enter the cooler, are of the psychrophilic type. However, during the chilling of the carcass and in subsequent cutting and processing of the meat it is continually exposed to environments, the temperatures of which are below 50° F. As a consequence, the growth of the contaminating psychrophilic bacteria on the carcass is favored, since the growth of strict mesophilic microorganisms which constitute the predominating flora of the carcass meat as it enters the cooler is restricted by the low temperatures employed. Thus as the carcass meat passes from the killing floor into the chill cooler and subsequently from the chill room to cutting rooms where further processing is done, there is a progressive increase in the numbers of psychrophilic bacteria that occur on the surfaces of the meat. It is the multiplication of these psychrophilic microorganisms that is eventually responsible for the spoilage of fresh meats. The contamination of fresh meats with psychrophilic bacteria is inevitable, since the processing steps through which the meat passes are conventionally carried out at temperatures promoting the growth of the psychrophilic contaminants on the carcass. This problem is compounded by the fact that the environments through which the chilled carcass subsequently passes are likewise maintained at temperatures which selectively favor the development of psychrophilic bacteria.

It would be desirable, therefore, to provide a method for processing meat and other similar products which are normally kept under refrigeration, which processing would be carried out under conditions which would limit or essentially eliminate substantial contamination by psychrophilic bacteria. It would also be desirable to provide a method in conjunction with the aforenoted handling procedures which would decontaminate meat products already contaminated with psychrophilic bacteria by virtue of their being handled under ordinary processing conditions.

It would also be desirable to have a method for the destruction of mesophilic bacteria, which organisms comprise approximately 99% of the contaminants to be found on carcass meat as it leaves the killing floor. Whereas these microorganisms are not capable of growth under normal refrigerated conditions, among them, nevertheless, are bacteria which are capable of producing disease, e.g., Staphylococci and Salmonellae. Accordingly, a procedure which would provide for the destruction of contaminating mesophilic bacteria would provide for a substantially more wholesome meat product.

BRIEF SUMMARY OF THE INVENTION

This invention relates to a method of processing meat products, under conditions which limit or reduce the population of surface bacteria. One such process includes:

(a) Slaughtering and dressing meat products;
(b) Decontaminating the meat surfaces to destroy surface bacteria including both psychrophilic and mesophilic bacteria;
(c) Processing and packaging the decontaminated meat under conditions which do not favor the growth of psychrophilic bacteria; and
(d) Storing the packaged meat products under conventional meat market refrigerated conditions which normally favor the proliferation of psychrophilic bacteria without substantial precipitate microbial spoilage or in the frozen state.

The process may also include an integral storage step at low temperatures either immediately after slaughtering and dressing or after the decontamination step or both. In the event that the product is stored after decontamination and prior to further processing and packaging, the storage should be carried out by introducing the decontaminated meat into an area which is maintained at a sufficiently low temperature as to bring about the rapid chilling of all exposed surfaces of the meat. Since meat tissue has a freezing point of about 29° F., the temperature of this area should be below about 29° F., preferably below about 5° F. for more rapid chilling of the surfaces of the meat. This low temperature environment does not support a population of either psychrophilic or mesophilic bacteria nor is it conducive to their growth and proliferation. Thus such an intervening storage step essentially preserves the decontaminated character of the meat products.

The chilled meat products may then be further processed under high temperature conditions by reducing them to cuts which are intended for consumer use and packaging the meat under the aforesaid high temperature conditions which do not favor the growth or proliferation of psychrophilic bacteria, i.e., above 50° F. up to 80 or 90° F. or above. Preferably, the packaging may be carried out at temperatures of from about 50 to 70° F. In the most preferred aspects of this invention the further processing and packaging is carried out at temperatures of from about 50 to about 60° F. or for ideal results from 50 to 55° F. to control contamination and proliferation of mesophilic bacteria.

In the event that the meat products are stored in refrigerators after slaughtering the temperature of the room is not critical since the decontamination step employed prior to further processing and packaging essentially destroys the surface bacteria (both psychrophilic and mesophilic). Thus refrigerators kept at about 29° F. say, for example from 30 to 40° F. (temperatures which customarily support substantial contaminating populations of psychrophilic bacteria and permit their growth and proliferation), may be employed. With such intervening storage conditions which are customary in the trade, substantial contamination with psychrophilic bacteria will result and the decontamination step becomes of mandatory importance.

A still further aspect of this invention is the reduction of the rate of development of oxidative rancidity in packaged meat products. By employing the decontamination step of the present invention, the development of bacterial spoilage in packaged meats is ameliorated to a marked degree. This benefit is observed whether the product is packaged in air tight containers or in the more conventional film packaging materials, such as cellophane, moisture impermeable cellophane, polyethylene, polystyrene, polyvinylidene chloride, etc. It has also been determined that oxidative degradation may be essentially eliminated as a factor of spoilage for the normal near-to-intermediate term storage of meat products (30 to 60 days or more) if air (oxygen) impermeable packaging film or materials are used and the meat is in the reduced state prior to freezing. This step involves a time lag after packaging to insure that the meat changes from the original bright red color of oxygenated myoglobin (oxymyoglobin) to a reduced (myoglobin) state (purplish blue) prior to the time that it is frozen or reduced to near freezing temperatures. The rate of conversion to be reduced depends on the temperature of the meat, higher temperatures being the most rapid and lower temperatures being slower until at a point near freezing, i.e., 28 to 30° F. or below the conversion to the reduced state is so slow as to preclude its occurrence. The form of the meat is also a factor since products like hamburger contain a substantially greater amount of trapped air than a primal cut such as a steak and, of course, would require more time to come to the reduced state. Generally, the time required ranges from about 30 minutes to 8 or 9 hours or up to 72 hours or more.

Another broad aspect of this invention is a process for decontaminating meat products which have been exposed to a variety of environmental conditions of the type which result in a substantial contamination population of psychrophilic and other types (mesophilic) of bacteria on the surface of the meat.

The decontaminated meat may, of course, be thereafter further processed under the aforenoted conditions which do not favor the growth of psychrophilic bacteria and packaged under these same conditions so as to produce a finished packaged product which may be stored without spoilage for extended periods of time under normal refrigerated conditions. Conventionally processed meat, of course, would undergo rapid microbial or oxidative spoilage when stored under the same conditions.

The referred to decontamination procedure involves placing the meat product into a chamber, the walls of which are maintained above 212° F. Concomitantly, steam is introduced into said chamber in a volume sufficient to reduce the population of vegetative bacteria on the surfaces of the meat. The decontaminated meat is removed from the chamber and further processed ultimately into retail packages. The decontamination step results in a superficial discoloration of exposed surfaces; however, when such meat is further processed to yield finished products, the color of the finished packaged products is indistinguishable from that produced from meats that have not been subjected to the decontamination step.

A substantial proportion of the interior walls of the decontamination chamber are maintained at temperatures which range from about 212° F. to as high as 300° F., and on some occasions may be as high as 400° F. although the most preferred range is above 230° F. to about 300° F. In this invention the heat used to raise the temperature of the decontamination chamber is supplied apart from the heat which is a concomitant of the steam. The walls of the chamber are maintained at a sufficiently high temperature as to prevent condensation from occurring or above the dew point for the conditions which prevail in the chamber, e.g., 212° F.

The steam supplied to the chamber is at atmospheric pressure as is the chamber. It is supplied in such a volume as is required to substantially decrease the bacterial population on the surface of the food product (such as meat). It has been found that insufficient steam or the use of dry heat alone will not result in a significant reduction of bacterial population.

The time required to reduce the surface or vegetative bacterial population under the proper conditions of temperature and steam volume is quite brief, normally from about 5 to 120 seconds and preferably from about 5 to about 90 seconds, and most preferably from 5 to 20 seconds at the most preferred temperatures. The only limitation is that the length of exposure of the meat may not be so long as to impair the color or function of the meat when it is subsequently further processed into a finished product.

As indicated, meat which is substantially free of contamination with psychrophilic and mesophilic microorganisms may be produced according to the procedures described. In the above noted procedure, further processing and packaging of this meat must be carried out to protect it from contamination with psychrophilic microorganisms and excessive development of mesophilic microorganisms. This may be accomplished by processing the meat in high temperature environments, the temperature of which is sufficiently high as to not be favorable to the development of psychrophilic microorganisms or favor the rapid growth of mesophilic microorganisms. Such environment will have a temperature above 50° F. and below 60° F., preferably from 51 to 55° F., but may range as high as 80 or 90° F. or above.

Regulations for meat handling have required that all processing procedures be carried out in refrigerated rooms, e.g., below 50° F., for the avowed purpose of restricting the growth of mesophilic bacteria which are associated with pathogens. It was felt that if a meat product contained psychrophilic bacteria, then the growth of pathogens would be restricted and/or the meat would spoil due to the greater growth rate of psychrophilic bacteria if the meat were mishandled. It has been found, however, that if a decontamination procedure is employed to reduce the population of both psychrophilic and mesophilic bacteria and the meat is then deliberately inoculated with pathogens such as Staphylococci and Salmonellae, the reduction of the psychrophilic populations does not appreciably enhance the growth rate of the pathogenic bacteria. There is obviously a great beneficial effect obtained from the decontamination process as described herein.

As an alternate to these particular temperatures, the decontaminated meat may be further processed and packaged at temperatures below 50° F. (i.e., 29 to 50° F.). However, it should be recognized that temperatures below 50° F. are within the range in which psychrophilic bacteria develop. If it is elected that the further processing of the meat shall be below 50° F., then provisions may have to be made for complete decontamination of the environment at sufficiently frequent intervals as to break the cycle of psychrophilic microbial growth. For example, if meat is processed in rooms below 50° F. it may be necessary to carry out a complete cleanup of the processing environment at least once in each four hour period or control the environment temperature to control psychrophilic bacteria. Under these conditions the small numbers of psychrophiles that may be introduced into the environment below 50° F. will still be in the lag phase of growth during the subsequent four hour processing period after the cleaning step.

A still further aspect of this invention is the use of air or oxygen impermeable packaging materials, especially the use of oxygen impermeable packaging materials in conjunction with the use of salt admixed with meat products in amounts of from about 0.5 to about 2.5%, preferably from about 1 to 2% salt. Salt is known to prevent bleeding of the meat but it is also known to promote oxidative degradation. It has been determined that if meat such as ground hamburger is mixed with salt and packaged in oxygen impermeable films and the packaged meat permitted to stand for a period and at a temperature sufficient to convert the same to a reduced (myoglobin) state and the packaged meat is then frozen or reduced to near freezing temperatures, its storage life is indefinitely prolonged and when thawed and exposed to the atmosphere, the original red color of oxygenated myoglobin (oxymyoglobin) is restored in a matter of minutes. Thus it is another aspect of this invention to produce a ground meat product containing salt as described herein and having a reduced propensity for separation of blood and body fluids therefrom.

Oxygen permeable films, such as cellophane and polyethylene have been used for the packaging of fresh red meats and may also be used in conjunction with this invention if color is not a factor. Such films were selected originally, because of their permeability to oxygen, causing the meat pigment, myoglobin, to be in the oxygenated (bright red) state. After one or two days of storage under refrigerated conditions, the bright red oxygenated pigment becomes oxidized to a less desirable form known as metmyoglobin. The latter is distinctly brown in color, and the consumer readily recognizes such meat as "not fresh." In terms of color, the salable life of fresh meat such as hamburger, fresh pork sausage, steaks and chops is only two or three to seven days in retail packages under refrigerated storage.

Myoglobin can be protected against oxidation if meat is packaged in an oxygen impermeable film, such as Saran brand and similar films containing vinylidene chloride polymers. Under these conditions myoglobin exists in the reduced form and has a purple color, as contrasted to oxymyoglobin which has a bright red color. The myoglobin of meat packaged in an oxygen impermeable film will remain in the reduced state indefinitely, under refrigerated storage, i.e., it will be converted neither to the oxygenated or the metmyoglobin stage.

Fresh meats have not been commonly packaged in Saran or films of similar oxygen impermeability, because under these conditions not only does the film offer a barrier against the entry of gases, it also forms a barrier against the escape of gases formed due to microbial development. Thus, in the past, fresh meats have not been successfully packaged in Saran, or similar films, because despite the color advantages that would accrue to the use of Saran, microbial development resulted in the trapping of gases within the package and an undesirable ballooning effect, by which the resulting product would have a limited or unimproved shelf life.

Aside from the color advantage accruing to the use of an oxygen impermeable film, it has been established by many workers that the packaging of meats in oxygen impermeable films has a desirable effect in controlling the type of bacteria which grow on the refrigerated product. Specifically, the spoilage of fresh red meats packaged in oxygen permeable films, such as polyethylene and cellophane is brought about by highly aerobic psychrophilic bacteria of the Pseudomonas-Achromobacter group. These bacteria attack primarily the protein components of the meat and produce undesirable flavors and odors. If, on the other hand, meat is packaged in an oxygen impermeable film, it has been established that the common fresh meat spoilage bacteria, previously mentioned, do not develop. The spoilage flora of meat that is packaged in Saran consists primarily of lactic acid bacteria, such as streptococci, lactobacilli, and related organisms of the psychrophilic group. These bacteria are capable of growth in the absence of oxygen. They grow actively on meats that are packaged in oxygen permeable films, but at a slower rate than the Pseudomonas-Achromobacter organisms. In aerobic environment, these organisms grow at the same rate. But the net effect of packaging meat in an oxygen impermeable film is desirable from the standpoint of microbial development. In either permeable or impermeable films the lactic acid bacetria grow, but their rate of growth again, is slower than the aerobic bacteria of the Pseudomonas-Achromobacter group. If the growth of the latter bacteria is prevented by packaging in an oxygen impermeable film, then the rate at which microbial spoilage develops is distinctly slower than in the oxygen permeable film wherein microbial spoilage takes place due to the growth of the faster developing Pseudomonas-Achromobacter type of bacteria. Furthermore, when the lactic acid bacteria grow on the meat, their major end product is lactic acid, and though this produces changes in the flavor of the meat, such changes are not nearly so undesirable as those produced by the highly aerobic bacteria.

Although the microbial advantages to packaging fresh meats in oxygen impermeable films have been known for some time, the industry has not been able to capitalize upon this effect, because the oxygen impermeable films do not permit the escape of gases formed within the package due to the growth of psychrophilic bacteria. Thus, in effect, the industry was not in a position to take advantage of the inhibition of the aerobic bacteria through air impermeable packaging.

Also as in the case of ground meats due to the volume of entrapped air when stuffed in an air impermeable film the environment inside the package is not anaerobic immediately after packaging. This is observed by the highly oxygenated state of the meat when held at various temperatures.

It is also well known that the packaging of fresh meat in oxygen impermeable films is a deterrent to oxidative rancidity of fats, which development can make meat unacceptable, independent of microbial development. Again, failure to control the development of gas producing bacteria has made it unfeasible to package fresh meats in oxygen impermeable films, and control the development of oxidative rancidity because the meat had to be held at such low refrigerated temperatures or freezing immediately after packaging to control microbial spoilage that the advantage of getting the meat into a reduced state imediately after packaging to control oxidation rancidity was not appreciated.

Under conditions where psychrophilic bacteria are controlled, it becomes possible to take advantage of oxygen impermeable films, such as Saran. The use of nitrogen or other non-oxygen containing inert gas as a flush in the gas impermeable film packages is also contemplated herein.

In the following examples, representative samples were removed periodically and analyzed for the presence of psychrophilic microorganisms. These analyses involved conventional plate count procedures, using tryptone glucose yeast extract agar, with the plates being incubated at a temperature of 40° F. Colonies were counted after 7 days incubation.

During the course of this storage study, the product in each of the packages that was sampled for psychrophilic microorganisms was also cooked and submitted to an expert taste panel for evaluation of evidence of microbial spoilage. At no time during the course of the study did the panel detect off odors of microbial origin in any of the samples tested which were prepared using the process of this invention. The products prepared by the processes of the present invention had a shelf life of from 2 to 3 times greater than conventionally processed meat products.

EXAMPLE 1

This example illustrates normal contamination of meat with psychrophilic bacteria in conventional processing. Carcass meat from pigs that were slaughtered and eviscerated under conventional conditions (+50° F.) was employed. Following evisceration the carcasses were introduced into a cooler maintained at 32 to 36° F. where they were held for 24 hours. Following this the carcasses were moved into a boning room maintained at 40° F. The meat was cut from the carcasses and placed in trucks which were then moved into a sausage-making room maintained at 36° F. In this room the trimmings were placed into a grinder and thereafter into a mixer and mixed with spices. The ground meat was then placed into a truck and taken to a stuffer. The meat was stuffed into casings and storage tests were carried out. The results appear in the following:

TABLE

|  | Psychrophilic microorganisms per gram | | |
| --- | --- | --- | --- |
|  | Saran | Cellophane | Polyethylene |
| Days of storage at 36° F.: | | | |
| 2 | 6,900 | 4,100 | 2,600 |
| 8 | 5,300 | 5,400 | 6,900 |
| 16 | 110,000 | 800,000 | 3,740,000 |
| 25 | 11,000,000 | 3,460,000 | 21,000,000 |

The data presented in the above table show that extensive growth of psychrophilic bacteria occurred in this product. The taste panel results indicated definite evidence of microbial spoilage which occurred in the various films after 13 to 20 days of storage. These off flavors were detected by the panel before any evidence of off flavors of chemical origin were noticed. These results typify the spoilage pattern of fresh meat processed under conventional conditions.

Further illustrative of the above are the results of storage tests conducted on a number of brands of fresh pork sausage purchased in retail stores. In these tests, arrangements were made to obtain multiple samples of the various brands of fresh pork sausage chubs on the day of their receipt at the retail market. Thereafter the packaged sausage was stored under the same conditions as were used in the previous examples. Taste panels and microbiological tests were conducted periodically as indicated in the following table.

| Product | Days of storage at 36° F. | Psychrophilic microorganisms per gram |
| --- | --- | --- |
| A | As received | 27,300 |
|  | 4 days | 770,000 |
|  | 11 days | 3,510,000 |
|  | 22 days | 57,000,000 |
| B | As received | 30,000 |
|  | 4 days | 1,410,000 |
|  | 11 days | 86,000,000 |
|  | 15 days | 180,000,000 |
| C | As received | 80,000 |
|  | 4 days | 460,000 |
|  | 11 days | 161,000,000 |
| D | 1 day | 35,000,000 |
|  | 6 days | 26,000,000 |
|  | 10 days | 272,000,000 |

It will be noted that there was significant development of psychrophilic microorganisms during the storage of all brands studied. Further, taste panel evaluations indicated that the shelf-life of the products tested varied from less than 6 to between 15 and 18 days. Further, in each instance the shelf-life of the stored product was terminated due to the development of off flavors of microbial origin.

The preceding examples have clearly shown that psychrophilic microorganisms are capable of growth in fresh meat products, and their extensive growth leads to spoilage which is manifested by the development of undesirable off flavors. If the numbers of psychrophilic microorganisms that contaminate the packaged finished product are controlled to a low level, then microbial spoilage of the product is not a practical problem within the normal storage life of the product, chemical change of non-microbial origin then being the cause for consumer rejection.

Further illustrative of this are meats which are commonly ground and packaged at the retail level. Hamburger and ground round steak offered for sale at retail regularly show psychrophilic counts in excess of ten million per gram and not uncommonly counts of greater than one hundred million per gram. As a consequence, most ground meat will show a practical shelf-life of no more than 1 to 4 days after purchase.

Not only are the trimmings highly contaminated, but so also are the primal and retail cuts from which the trimmings are taken contaminated with psychrophilic microorganisms, and have an extremely limited shelf-life, e.g., 1 to 5 days under refrigerated conditions.

The microbial contamination of carcass meats as well as primal and retail cuts is limited to the exposed surfaces, the interior tissue being virtually sterile. As a corollary to this, the spoilage of fresh unground meats is a surface problem.

Accordingly, destruction of the surface microorganisms contaminating carcasses or smaller cuts of meat, results in a packaged finished product which has a significantly enhanced shelf-life. The process of this invention embodies a procedure for the decontamination of meat surfaces which entails exposure of meat to live steam at atmospheric pressure in a chamber maintained at elevated temperatures for a short period of time.

Steam has been used to pasteurize cooked meat. However, when steam alone is used to decontaminate fresh red meats, the exposure time necessary causes excessive cooking of the interior meat. The process of this invention circumvents this problem and makes it possible to decontaminate meat surfaces in a fraction of the time that is required under the most ideal conditions through the use of steam alone, and without the use of pressure. When the process of this invention is applied there is a minor surface discoloration of exposed lean tissue. However, depending upon the material treated, primal or retail cuts as well as ground meat prepared from the decontaminated raw material is indistinguishable in color or function from comparable meat not exposed to the decontamination treatment.

The method of decontamination encompasses the introduction of meat into a heated chamber and the introduction of steam into the chamber at atmospheric pressure. The preferred conditions involve a chamber, the walls of which are maintained at a temperature at about 212° F. and above by the use of ancillary heat. This may be accomplished in one of several ways. For example, the walls may be jacketed to form a plenum and heated by an external source, such as a gas burner. Electric calrods may be used in a jacket. Alternatively, the outer shell of the cabinet may be maintained above 212° F. by means of metal coils through which high pressure steam is circulated. Under these conditions when steam is thereafter injected into the chamber, the interior temperature of the chamber rapidly reaches decontaminating temperatures. When the walls of the chamber are maintained at temperatures above 212° F., then with the introduction of the steam into the chamber, no condensation of the steam on the walls of the chamber can occur.

The following examples show the utilization of the steam chamber to decontaminate red meats, in this case beef.

EXAMPLE 2

The following are results of the experiment wherein the jacket temperature was maintained at 215 to 230° F. The meat products prior to treatment had bacteria counts of from 422,000 to 2,600,000 per gram. Steam was introduced by 3 to 6 jets, ⅛ inch in diameter, using 5 to 25 p.s.i. steam. The following results were obtained.

In the following experimental data, the chamber temperature is shown as recorded by a conventional dial thermometer. It was determined that this device had a recording lag time of about 7 seconds. Thus, the actual temperatures were higher than those set forth in the table. This is more noticeable in the short exposure periods. In any event, the time sequences where substantially complete decontamination occurred were such that the chamber temperature approached or exceeded pasteurization temperatures in the range of 180° F.

| Time of exposure (seconds) | Chamber temperature (range) °F. | Jacket temperature (maximum) °F. | Bacteria per gram treated |
|---|---|---|---|
| 5 [1] | 130 | 230 | 15,000 |
| 10 [1] | 130–160 | 230 | 400 |
| 15 | 130–175 | 230 | 0 |
| 20 | 130–185 | 230 | 0 |
| 5 [1] | 160 | 250 | 100 |
| 10 [1] | 160–170 | 250 | 0 |
| 15 [1] | 160–190 | 280 | 0 |
| 20 | 160–197 | 300 | 0 |
| 5 [1] | 180 | 300 | 2,600 |
| 10 [1] | 180–185 | 300 | 0 |
| 15 | 180–190 | 300 | 0 |
| 20 | 180–195 | 300 | 0 |
| 5 | 200–195 | 320–40 | 0 |
| 10 | 200–192 | 320–40 | 0 |
| 15 | 200–190–195 | 320–40 | 0 |
| 20 | 200–190–200 | 320–40 | 0 |
| 10 | 220–205 | 320 | 0 |
| 10 | 240–205 | 330 | 0 |
| 10 | 280–250 | 380 | 0 |
| 10 | 300–260 | 375 | 0 |
| 10 | 340–310 | 395 | 0 |

[1] Red surface, no sign of denaturing.

EXAMPLE 3

In the following example, pork skins were intentionally heavily inoculated with a mixture of bacteria, including coliforms, Salmonella and coagulase positive Staphylococci. The jacket temperature was 300° F. and the chamber temperature ranged from 200 to 218° F. The inoculated but untreated meat was analyzed in triplicate. Duplicate samples were treated and analyzed after 10 and 15 seconds exposure. Results are summarized in the following table:

| Treatment | Bacteria per gram | | | |
| | Total count | Coliform | Salmonella | Staphylococcus |
|---|---|---|---|---|
| None (control) | 9,000,000 | 910,000 | 1,000,000,000 | 19,000 |
|  | 7,000,000 | 1,370,000 | 1,000,000,000 | 16,000 |
|  | 11,000,000 | 2,210,000 | 1,000,000,000 | 17,000 |
| 10 seconds | 42,000 | 10 | 10 | <1 |
|  | 37,000 | <1 | <10 | <1 |
| 15 seconds | <100 | <10 | <10 | <1 |
|  | 200 | <1 | <10 | <1 |

EXAMPLE 4

Lean and fat pork trimmings were purchased in a retail supermarket. These were divided into two portions, one of which was subjected to decontamination. In connection with the decontamination, the jacket temperature was 300° F., the chamber temperature varied from 220 to 215° during the course of the treatment. The time of exposure was 20 seconds. The treated trimmings were ground and seasoned and packaged. The treated trimmings showed an initial psychrophilic count of 600 per gram. After 8 days, the sausage made from treated trimmings showed a count of 170,000 per gram. After 20 days of storage the sausage showed a count of 300,000 per gram. After 25 days of storage the count was 350,000 per gram and after 30 days of storage it showed a count of 1,500,000 per gram. Organoleptic evaluation of the treated sausage was conducted by an expert panel. The sausage was satisfactory after 26 days storage at 40° F.

Sausage made from the companion untreated trimmings showed an initial psychrophilic count of 2,360,000 per gram. After 6 days of storage the control sausage showed a count of 15,000,000 per gram. The sausage was submitted to the panel after 6 days of storage and was satisfactory. However, after 12 days of storage the product was sour and rejected by the taste panel. At this point the control sausage showed a psychrophilic count of 56,000,000 per gram.

EXAMPLE 5

Fresh beef trimmings, as used by retail meat markets to prepare ground beef, were purchased at the retail level. The trimmings were divided into two equal portions. One posure to steam in the decontamination chamber for 10 seconds. The jacket temperature was 310° F. The initial temperature in the chamber was 215° F., and during the course of the 10 seconds exposure to steam, the chamber temperature dropped from 215 to 212° F. The surface of the treated trimmings was denatured superficially, the depth of the denatured layer being less than 1 millimeter. The treated trimmings were divided into two portions. Portion 1 was immediately ground through a meat grinder and thereafter stuffed into sausage casings, half of which were Saran and the other half were polyethylene. The second portion of the treated trimmings was mixed with 10% fresh ground beef that was purchased at retail as a packaged ground beef. This ground beef was analyzed and showed a psychrophilic bacterial content of 10,000,000 per gram. The mixture (treated trimmings and ground beef) were ground and thereafter stuffed in polyethylene and Saran. Finally, the untreated trimmings were ground through a sanitized grinder and thereafter stuffed in polyethylene and cellophane.

The packaged product was placed in a cooler maintaining a temperature of 40° F. Representative samples of the stuffed products were analyzed immediately, with of the following results—

| Product: | Phychrophilic bacteria per gram |
|---|---|
| Treated trimmings | ND |
| Treated trimmings plus retail ground beef | 800,000 |
| Untreated trimmings | 50,000 |

After 24 hours storage, the packaged product was examined, with the following results—

| Product: | Color |
|---|---|
| Treated trimmings, Saran | Deep purple. |
| Treated trimmings, polyethylene | Red. |
| Treated trimmings, plus ground beef, polyethylene | Red. |
| Treated trimmings, plus ground beef, Saran | Deep purple. |
| Untreated trimmings, polyethylene | Red. |
| Untreated trimmings, Saran | Deep purple. |

After one week of storage at 40° F. all three polyethylene packaged variables showed extensive brown discoloration; whereas all Saran packed variables maintained a deep purple color. The ground meat prepared from untreated trimmings, as well as that prepared from treated trimmings plus retail ground beef exhibited a distinct stale off-odor, characteristic of old meat. Taste panels were conducted on each of the six variables. The treated meat, both that packaged in polyethylene and Saran were found to have a satisfactory flavor by the taste panel. Both polyethylene and Saran packaged untreated meat and the treated meat that had been mixed with retail ground meat showed unsatisfactory panel scores.

EXAMPLE 6

A 10 pound pork loin was purchased at a retail market. It was hung in a steam chamber, the initial temperature of which was 100° F. The jacket temperature was 230° F. Steam showing 25 p.s.i. gauge pressure at the source was injected into the chamber for 20 seconds, during which time the chamber temperature rose from 100 to 180° F. Considering the known lag time of the thermometer used, it is calculated that the true chamber temperature was approximately 195° F. at the time steam injection was completed. The pork loin was then cut into chops.

The chops were introduced into Saran coated Mylar pouches which were evacuated with a vacuum pump and thereafter back-filled with nitrogen gas and sealed. Another series of chops were introduced into polyethylene bags and flushed with nitrogen gas. The packaged chops were placed in a cooler maintained at 40° F.

As a control a second pork loin was purchased from the same source and cut into chops without prior decontamination. The chops were packaged in Saran coated Mylar and polyethylene as described above.

After two days of storage the polyethylene packaged chops, both treated and untreated, showed brown discoloration, indicative of conversion of the myoglobin to the met form. The Saran coated Mylar packaged chops showed a purplish color, indicative of myoglobin in the reduced form.

After eight days of storage, the untreated chops, both in Saran coated Mylar and in polyethylene, exhibited a distinct and offensive off-odor and showed evidence of bacterial slime. Neither of these chops were submitted for taste panel evaluation, because of their obvious decomposed condition. The treated chops, packaged in polyethylene, were distinctly brown but exhibited no off-odor. The treated chops packaged in Saran coated Mylar showed a slightly purple color before the package was opened and after opening developed a bright red color within 15 minutes. The Saran coated Mylar packaged treated chops were quite normal in odor. The taste panel graded the polyethylene packaged treated chop as slightly rancid. The panel found the Saran coated Mylar packaged treated chops satisfactory in flavor.

Freezing and low temperature holding of meat packaged in an air impermeable film When meat is packaged in an air impermeable film, the meat is eventually reduced to the myoglobin state. The rate the meat is reduced to the myoglobin state is dependent on the temperature of the meat and in the case of ground meat, possibly the amount of entrapped air in the meat.

This is of particular importance when salt is added to the meat and the meat is to be frozen or held near freezing temperatures after packaging.

By observing the temperature of the meat and the time to be reduced to the myoglobin state, it has been found possible to add salt to a meat product packaged in an air impermeable film and then freeze the product after a predetermined time and delay to circumvent the problems of oxidative rancidity normally associated with the addition of salt for periods of time far in excess of that which is anticipated for products made from chilled meat.

When meat is in the oxymyoglobin (red) state when packaged in an air impermeable film, to insure the redevelopment of the oxymyoglobin color immediately upon exposing the meat to the atmosphere, the meat must be held at temperatures above freezing for a predetermined time to bring it to the reduced (myoblogin) state.

If oxygenated meat packaged in Saran is reduced in temperature at a rate and to a level so as not to permit or greatly slow down the reduction to the myoglobin state, the meat upon opening of the package will show signs of being in the metmyoglobin (brown) state and will be objectionable to the consumer.

For example:

(1) Meat ground and packaged at 30° F. and stored in a 36° F. storage cooler takes 24 to 36 hours to reach the reduced myoglobin state.
(2) Meat ground and packaged at 50° F. and stored in a 36° F. cooler takes 8 to 9 hours to reach the reduced myoglobin state.
(3) Meat ground and packaged at 70° F. and held at room temperature (65–70° F.) takes less than 2 hours to reach the reduced myoglobin state.
(4) Meat ground and packaged at 90° F. and held at room temperature (65–70° F.) takes less than 1 hour to reach the reduced myoglobin state.

If the color of the meat is observed and the meat handled in such a manner so that it is not reduced to temperatures below freezing (27–28° F.) before the meat reaches the reduced myoblogin state then the frozen storage life of the meat is greatly improved.

EXAMPLE 7

Decontaminated ground meat containing 1½% salt had a temperature at the time of stuffing and packaging of 50–52° F. (The meat was stuffed in a Saran casing.) The packaged product was placed in #10 cartons and sealed. Cartons were held in a 36 to 40° F. room for approximately 3 hours before placing in a 0° F. freezer. After placing in freezer it took approximately 5 to 6 hours for the product to reach 30° F. (this is due to product being in a sealed carton).

COLOR AND TASTE PANEL EVALUATION OF FROZEN PRODUCT

| Days storage | Polyethylene | | Saran | | Cellophane | |
|---|---|---|---|---|---|---|
| | Color | Taste panel | Color | Taste panel | Color | Taste panel |
| 1 | Satisfactory | Satisfactory | Satisfactory | Satisfactory | Satisfactory | Satisfactory. |
| 37 | Brown ring | Marginal | do | do | Brown ring | Marginal. |
| 54 | Brown | Unsatisfactory rancid. | do | do | Brown | Unsatisfactory rancid. |
| 63 | | | do | do | | |
| 86 | | | do | do | | |
| 101 | | | do | do | | |

EXAMPLE 8

This was done the same as Example 7 except the meat was frozen to 20° F. within 2 hours and then stored in a freezer at +5 to 10° F.

After 28 days in the freezer the product was examined for color. All packages showed varying degrees of discoloration. The product was submitted to a taste panel for evaluation. The product was graded slightly rancid to rancid and was rejected by the panel.

It has been determined that denaturation of the meat processed in accordance with the present invention (decontamination chamber step) can be avoided to a substantial extent by decontamination of the meat after it is covered with a meat shroud, which is a cheese cloth-like porous fabric used to minimize contamination.

When using a meat shroud in conjunction with a decontamination step, the exposure times are somewhat extended. It has also been found that films, such as, for example, polyethylene, may be applied to contaminated meat as an encasement and the decontamination carried out on the encased meat product. While for good results the exposure time is somewhat extended, the surface is likewise, as in the case of a cloth meat shroud, protected from severe denaturation.

We claim:

1. A method of processing meat products to reduce the population of surface bacteria and enhance the storage life thereof, which comprises:
   (a) slaughtering and dressing meat;
   (b) decontaminating the meat surfaces to destroy vegetative and other surface bacteria thereon including both psychrophilic and mesophilic bacteria by introducing the meat into a decontamination chamber wherein the walls thereof are maintained at a temperature above 212° F., and introducing steam into said chamber in an amount and for a time sufficient to reduce the population of said vegetative bacteria to a low level and under conditions and for a time period that will not effect a substantial denaturation of the meat surfaces;
   (c) further processing the meat by reducing the same to cuts for consumer use and packaging the meat in environmental conditions which do not favor the growth and proliferation of psychrophilic bacteria; and
   (d) storing the packaged meat products under conventional meat market refrigerated conditions which normally favor the growth and proliferation of psychrophilic bacteria.

2. A process according to claim 1 wherein step (c) is carried out at temperatures above 50° F.

3. A process according to claim 1 wherein the packaging of step (c) is carried out using an air impermeable plastic film packaging material.

4. A process according to claim 3 wherein the package is flushed with an inert gas prior to sealing.

5. A process according to claim 1 wherein the decontaminated meat product is placed in a low temperature environment below about 29° F. for a period prior to commencing the further processing and packaging thereof.

6. A process according to claim 1 wherein the packaged meat product is packaged in an oxygen impermeable film and wherein the packaged product is maintained at temperatures above about 29° F. for a period of time to convert the meat to the reduced state prior to placing the same into refrigerated conditions below 29° F.

7. A process according to claim 6 wherein an amount of salt is added to said meat product sufficient to reduce the bleeding tendencies thereof prior to packaging.

8. A method of processing meat products to reduce surface bacterial contamination thereof and to provide enhanced shelf storage life thereof in packaged form under normal meat refrigeration conditions which comprises:
   (a) decontaminating a meat product contaminated on the surface thereof with vegetative bacteria by introducing said meat into a decontamination chamber wherein the walls thereof are maintained at a temperature of about 212° F. and above by ancillary heat, introducing steam into said heated chamber and maintaining said steam in said chamber at a volume and for a time sufficient to reduce the vegetative bacterial population thereof to a low level without substantially denaturing the meat;
   (b) further processing and packaging the meat under conditions which do not support the growth of psychrophilic bacteria; and
   (c) storing the packaged meat under refrigerated conditions which usually support the growth of psychrophilic bacteria.

9. A process according to claim 8 wherein the decontamination is carried out in a chamber having walls heated to temperatures between about 212° F. and 300° F.

10. A process according to claim 8 wherein the further processing and packaging is carried out at temperatures above 50° F.

11. A process according to claim 8 wherein the package is flushed with nitrogen gas prior to sealing.

12. A process for producing a ground meat product having an extended storage life which comprises:
   (a) decontaminating surface contaminated meat products by placing the meat products in a decontamination chamber wherein the walls are maintained above about 212° F. and introducing steam therein in an amount and for a period sufficient to reduce the surface contamination thereof to a low level without substantially denaturing the meat;
   (b) further processing the meat by grinding and packaging the ground meat product in an air impermeable plastic film under conditions which do not favor the contamination of the meat by, or the growth of contaminating bacteria; and
   (c) maintaining said packaged meat product in a temperature environment and for a time which permits the conversion of the same to a reduced myoglobin state prior to placing the packaged ground meat product under refrigeration.

13. A process for producing a ground meat product having a reduced propensity for separation of blood and other fluids therefrom, and having a reduced tendency toward oxidative degradation when stored for extended periods under refrigeration which comprises:
   (a) decontaminating a meat product of which the surfaces are contaminated with psychrophilic bacteria by placing said meat in a decontamination chamber, the walls of which are maintained at temperatures of 212° F. and above in the presence of steam for a period of time sufficient to reduce the population of vegetative bacteria thereon but not effect a substantial denaturation of the meat;
(b) further processing said meat by comminuting and admixing with salt in an amount to prevent bleeding and of up to about 2½ percent by weight thereof;
(c) packaging said further processed meat in an air impermeable packaging material in a non-contaminating environment;
(d) maintaining said packaged product at temperatures which permit the conversion thereof to the reduced myoglobin state;
(e) storing the packaged meat in the reduced state under refrigerated conditions.

14. A process according to claim 13 wherein the amount of salt incorporated is between about 1 and 2% by weight of the meat.

References Cited

UNITED STATES PATENTS

| | | | |
|---|---|---|---|
| 2,364,049 | 12/1944 | Bensel | 99—194 X |
| 2,925,346 | 2/1960 | Harper et al. | 99—174 |
| 2,965,494 | 12/1960 | Williams | 99—157 |
| 3,180,740 | 4/1965 | Martin | 99—187 X |
| 3,537,867 | 11/1970 | Glasser et al. | 99—187 X |

OTHER REFERENCES

American Meat Institute Foundation, "The Science of Meat and Meat Products," 1960, M. H. Freeman & Co., San Francisco, Calif., pp. 151–154, 164, 165.

HYMAN LORD, Primary Examiner

U.S. Cl. X.R.

99—107, 157, 174